United States Patent
Matsumoto et al.

(10) Patent No.: US 11,430,241 B2
(45) Date of Patent: Aug. 30, 2022

(54) ENTRY FIELD EXTRACTION DEVICE AND COMPUTER READABLE MEDIUM

(71) Applicant: Mitsubishi Electric Corporation, Tokyo (JP)

(72) Inventors: Mitsuhiro Matsumoto, Tokyo (JP); Eri Kataoka, Tokyo (JP); Yosuke Watanabe, Tokyo (JP); Shunsuke Yamamoto, Tokyo (JP); Mikihito Kanno, Tokyo (JP); Takamichi Koide, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/964,896

(22) PCT Filed: Aug. 24, 2018

(86) PCT No.: PCT/JP2018/031449
§ 371 (c)(1),
(2) Date: Jul. 24, 2020

(87) PCT Pub. No.: WO2019/150628
PCT Pub. Date: Aug. 8, 2019

(65) Prior Publication Data
US 2021/0034853 A1     Feb. 4, 2021

(30) Foreign Application Priority Data

Jan. 30, 2018   (JP) ............................. JP2018-013754

(51) Int. Cl.
*G06V 30/413*     (2022.01)
*G06T 7/11*       (2017.01)
(Continued)

(52) U.S. Cl.
CPC ............. *G06V 30/413* (2022.01); *G06N 3/08* (2013.01); *G06T 7/11* (2017.01); *G06V 10/10* (2022.01)

(58) Field of Classification Search
CPC .......... G06K 9/00456; G06K 9/00442; G06K 9/00449; G06K 9/00463; G06K 9/20;
(Continued)

(56) References Cited

U.S. PATENT DOCUMENTS 5,416,849 A  *  5/1995  Huang ................. G06K 9/2054
                                                        358/403
5,546,503 A     8/1996  Abe et al.
(Continued)

FOREIGN PATENT DOCUMENTS

JP      4-114560 A      4/1992
JP      4-175964 A      6/1992
(Continued)

OTHER PUBLICATIONS

International Search Report (PCT/ISA/210) issued in PCT/JP2018/031449, dated Nov. 20, 2018.
(Continued)

*Primary Examiner* — Claire X Wang
*Assistant Examiner* — Stephen M Brinich
(74) *Attorney, Agent, or Firm* — Birch, Stewart, Kolasch & Birch, LLP

(57) ABSTRACT

In an entry field extraction device, a learning unit obtains a learning model by learning, from images of a plurality of documents, features corresponding to types of the documents. A feature field extraction unit extracts, from an image of a document sample, a feature field being a field indicating a feature corresponding to a type of the document sample, using the learning model. An entry field extraction unit extracts an entry field, being a field of an entry column, from
(Continued)

a field that remains in the image of the document sample from which the feature field extracted by the feature field extraction unit has been excluded.

8 Claims, 9 Drawing Sheets

(51) Int. Cl.
  *G06N 3/08* (2006.01)
  *G06V 10/10* (2022.01)
(58) Field of Classification Search
  CPC .. G06K 9/2054; G06K 9/2063; G06K 9/2072; G06T 7/10; G06T 7/11; G06T 7/12; G06T 7/13; G06V 10/70; G06V 10/82; G06V 10/10; G06V 10/25; G06V 10/26; G06V 30/153; G06V 30/148; G06V 30/41
  USPC ............... 382/128, 100, 173, 177–180, 187
  See application file for complete search history.

(56) References Cited

U.S. PATENT DOCUMENTS

| | | | |
|---|---|---|---|
| 5,884,296 A | 3/1999 | Nakamura et al. | |
| 5,937,084 A | 8/1999 | Crabtree et al. | |
| 6,400,845 B1* | 6/2002 | Volino | G06K 9/2054 358/462 |
| 6,507,671 B1* | 1/2003 | Kagan | G06K 9/346 358/464 |
| 6,886,136 B1* | 4/2005 | Zlotnick | G06K 9/00449 715/780 |
| 7,917,844 B1* | 3/2011 | Zlotnick | G06K 9/00449 715/234 |
| 2006/0026148 A1* | 2/2006 | Furuhashi | G06F 16/50 |
| 2010/0142832 A1 | 6/2010 | Nafarieh et al. | |
| 2011/0231749 A1* | 9/2011 | Cameron | G09G 5/397 715/223 |
| 2012/0201457 A1* | 8/2012 | Bart | G06K 9/00442 382/176 |
| 2013/0198615 A1* | 8/2013 | Zuev | G06K 9/2072 715/243 |
| 2014/0108397 A1* | 4/2014 | Zubizarreta | G06F 16/93 707/736 |
| 2015/0278710 A1 | 10/2015 | Hisada | |
| 2017/0220891 A1 | 8/2017 | Kim et al. | |

FOREIGN PATENT DOCUMENTS

| | | |
|---|---|---|
| JP | 8-251404 A | 9/1996 |
| JP | 10-91712 A | 4/1998 |
| JP | 10-254991 A | 9/1998 |
| JP | 2001-229341 A | 8/2001 |
| JP | 2006-43007 A | 2/2006 |
| JP | 2006-127446 A | 5/2006 |
| JP | 2007-251518 A | 9/2007 |
| JP | 2007-317034 A | 12/2007 |
| JP | 2010-61523 A | 3/2010 |
| JP | 2010-140478 A | 6/2010 |
| JP | 2015-185149 A | 10/2015 |
| JP | 2016-57925 A | 4/2016 |
| JP | 2016-71412 A | 5/2016 |
| JP | 2016-146174 A | 8/2016 |
| JP | 2017-10069 A | 1/2017 |
| JP | 2017-59090 A | 3/2017 |

OTHER PUBLICATIONS

Notice of Reasons for Refusal issued in Japanese Application No. 2018-013754, dated Nov. 20, 2018.

* cited by examiner

ENTRY FIELD EXTRACTION DEVICE AND COMPUTER READABLE MEDIUM

TECHNICAL FIELD

The present invention relates to an entry field extraction device and an entry field extraction program.

BACKGROUND ART

Patent Literature 1 describes a technique of dividing each of a plurality of standard form documents into a plurality of small fields, extracting a feature quantity of an average density and a feature quantity of an average color of RGB components of each small field, and extracting a field of an entry column based on variation quantities of the feature quantities.

Patent Literature 2 describes a technique of processing an intermediate image generated by a neural network and extracting and synthesizing images of fields indicating features of a target object based on an amount of change of a loss function.

Patent Literature 3 describes a technique of performing locally adaptive threshold processing and dilation processing on a low-resolution image to perform locally adaptive binarization of color components, thereby extracting a character field.

CITATION LIST

Patent Literature

Patent Literature 1: JP 2010-061523 A
Patent Literature 2: JP 2017-059090 A
Patent Literature 3: JP 2007-251518 A

SUMMARY OF INVENTION

Technical Problem

The technique described in Patent Literature 1 is susceptible to deviation and noise, and an extraction precision greatly depends on parameters. Since a method of determining the small field and the setting of the threshold values of the variation quantities are complicated, even if the technique described in Patent Literature 1 is applied, sufficient precision may not actually be obtained.

An objective of the present invention is to extract a field of an entry column from a document sample with high precision.

Solution to Problem

An entry field extraction device according to one aspect of the present invention includes:

a feature field extraction unit to extract, from an image of at least one document sample, a feature field being a field indicating a feature corresponding to a type of the document sample, using a learning model obtained by learning, from images of a plurality of documents, features corresponding to types of the documents, the plurality of documents including entry columns predetermined according to the types of the documents, the entry columns having been filled separately in the individual documents; and an entry field extraction unit to extract an entry field, being a field of an entry column, from a field that remains in the image of the document sample from which the feature field extracted by the feature field extraction unit has been excluded.

The feature field extraction unit expresses, in a numerical value, saliency of the feature corresponding to the type of the document sample in units of pixels of the image of the document sample, and binarizes the numerical value of the saliency referring to a threshold value, to divide the image of the document sample into the feature field and the remaining field.

An object field extraction unit is further included to extract, from the image of the document sample, one or more object fields each being a field where an object is written in the document sample, as candidates of the entry field, wherein the entry field extraction unit excludes, among the object fields extracted by the object field extraction unit, an object field that overlaps with the feature field, from the candidates of the entry field.

The entry field extraction unit synthesizes, among the object fields extracted by the object field extraction unit, two or more object fields overlapping with each other.

The entry field extraction unit synthesizes, among the object fields extracted by the object field extraction unit, two or more object fields a distance between which is equal to or smaller than a threshold value.

The entry field extraction unit excludes, among the object fields extracted by the object field extraction unit, an object field having an area equal to or smaller than a threshold value, from the candidates of the entry field.

The object field extraction unit recognizes at least a character and a mark, each as the object.

An entry field synthesis unit is further included which, in a case where feature fields are extracted from the images of the plurality of document samples by the feature field extraction unit, and two or more entry fields, being extracted by the entry field extraction unit from fields that remain in images of each of different document samples from which the feature fields have been excluded, overlap with each other, synthesizes the two or more entry fields.

An entry field extraction program according to one aspect of the present invention causes a computer to execute:

a feature field extraction process of extracting, from an image of at least one document sample, a feature field being a field indicating a feature corresponding to a type of the document sample, using a learning model obtained by learning, from images of a plurality of documents, features corresponding to types of the documents, the plurality of documents including entry columns predetermined according to the types of the documents, the entry columns having been filled separately in the individual documents; and an entry field extraction process of extracting an entry field, being a field of an entry column, from a field that remains in the image of the document sample from which the feature field extracted by the feature field extraction process has been excluded.

Advantageous Effects of Invention

In the present invention, an image of a document sample is not finely divided, and a field of an entry column is extracted from a field that remains in the image from which a feature field extracted with using a learning model has been excluded. Hence, an influence of deviation and noise can be reduced. Therefore, according to the present invention, the field of the entry column can be extracted from the document sample with high precision.

DESCRIPTION OF EMBODIMENTS

Figure 1:
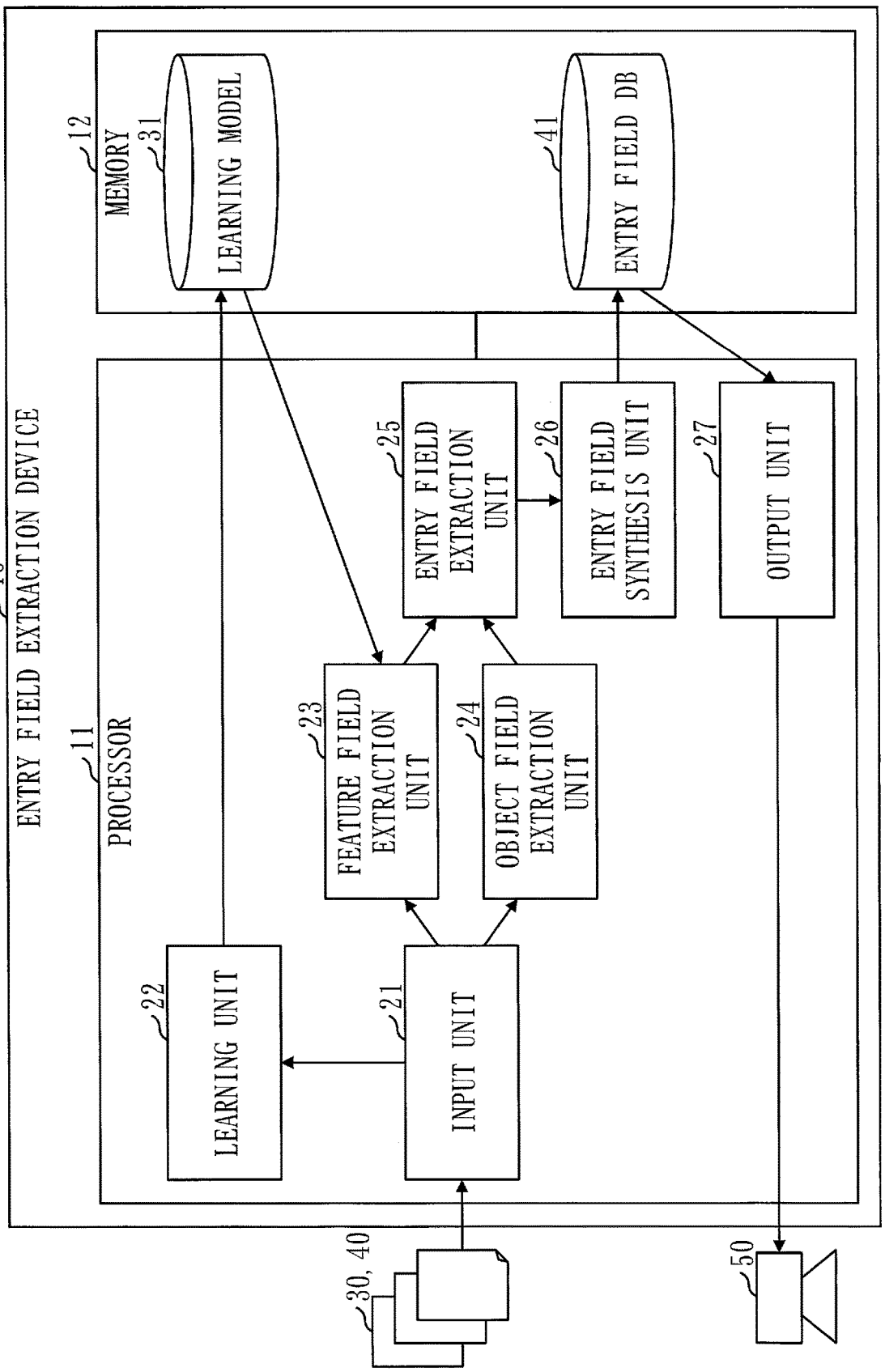
FIG. 1 is a block diagram illustrating a configuration of an entry field extraction device according to Embodiment 1.

An embodiment of the present invention will be described below with referring to drawings. In the drawings, the same or equivalent portions are denoted by the same reference numerals. In description of the embodiment, explanation on the same or equivalent portions will be appropriately omitted or simplified. Note that the present invention is not limited to the embodiment to be described below, and various changes can be made where necessary. For example, the embodiment to be described below may be practiced partly.

Embodiment 1

The present embodiment will be described with referring to FIGS. 1 to 9.

Description of Configuration

A configuration of an entry field extraction device 10 according to the present embodiment will be described with referring to FIG. 1.

The entry field extraction device 10 is a computer. The entry field extraction device 10 is provided with a processor 11 and other hardware devices such as a memory 12. The processor 11 is connected to the other hardware devices via signal lines and controls these other hardware devices.

The entry field extraction device 10 is provided with an input unit 21, a learning unit 22, a feature field extraction unit 23, an object field extraction unit 24, an entry field extraction unit 25, an entry field synthesis unit 26, and an output unit 27, as function elements. Functions of the input unit 21, learning unit 22, feature field extraction unit 23, object field extraction unit 24, entry field extraction unit 25, entry field synthesis unit 26, and output unit 27 are implemented by software.

The processor 11 is a device that executes an entry field extraction program. The entry field extraction program is a program that implements the functions of the input unit 21, learning unit 22, feature field extraction unit 23, object field extraction unit 24, entry field extraction unit 25, entry field synthesis unit 26, and output unit 27. The processor 11 is, for example, a CPU, a GPU, or a DSP; or a combination of some or all of a CPU, a GPU, and a DSP. Note that "CPU" stands for Central Processing Unit, "GPU" stands for Graphics Processing Unit, and "DSP" stands for Digital Signal Processor.

The memory 12 is a device that stores the entry field extraction program. The memory 12 is, for example, a RAM or a flash memory; or combination of a RAM and a flash memory. Note that "RAM" stands for Random Access Memory.

A display 50 is connected to the entry field extraction device 10 as external hardware.

The display 50 is an apparatus that displays data outputted from the entry field extraction program onto its screen. The display 50 is, for example, an LCD. Note that "LCD" stands for Liquid Crystal Display. The display 50 may be provided to the entry field extraction device 10 as internal hardware.

The entry field extraction device 10 may be provided with a communication device or/and an input apparatus as other internal hardware.

The communication device includes a receiver which receives data to be inputted to the entry field extraction program, and a transmitter which transmits data outputted from the entry field extraction program. The communication device is, for example, a communication chip or an NIC. Note that "NIC" stands for Network Interface Card.

The input apparatus is an apparatus operated by a user for inputting data to the entry field extraction program. The input apparatus is, for example, a mouse, a keyboard, a touch panel, or a scanner; or a combination of some or all of a mouse, a keyboard, a touch panel, and a scanner.

Images 30 of a plurality of documents are inputted to the entry field extraction device 10 via the communication device, the input apparatus, or another interface. The documents include entry columns predetermined according to types of the documents. Entry columns are filled separately in the individual documents. For example, an example of document type is an account application form. Every account application form includes a name entry column in common. However, since different persons fill individual account application forms, the name entered in the entry column differs depending on the account application form.

An image 40 of at least one document sample is also inputted to the entry field extraction device 10 via the communication device, the input apparatus, or another interface. In the present embodiment, images 40 of a plurality of document samples are inputted to the entry field extraction device 10.

In the memory 12, a learning model 31 is stored and an entry field database 41 is constructed. The learning model 31 is a model obtained by learning, from the images 30 of the plurality of documents, features corresponding to types of the documents. The entry field database 41 is a database in which fields of entry columns extracted from the images 40 of the plurality of document samples are recorded in the form of image data or another format.

The entry field extraction program is read by the processor 11 from the memory 12 and executed by the processor 11. Not only the entry field extraction program but also an OS is stored in the memory 12. Note that "OS" stands for Operating System. The processor 11 executes the entry field extraction program while executing the OS. The entry field extraction program may be incorporated in the OS partly or entirely.

The entry field extraction program and the OS may be stored in an auxiliary storage device. The auxiliary storage device is, for example, an HDD or a flash memory; or a combination of an HDD and a flash memory. Note that "HDD" stands for Hard Disk Drive. If stored in the auxiliary storage device, the entry field extraction program and the OS are loaded to the memory 12 and executed by the processor 11.

The entry field extraction device 10 may be provided with a plurality of processors which substitute for the processor 11. The plurality of processors share execution of the entry field extraction program. Each processor is, for example, a CPU, a GPU, or a DSP; or a combination of some or all of a CPU, a GPU, and a DSP.

Data, information, a signal value, and a variable value which are utilized, processed, or outputted by the entry field extraction program are stored in the memory 12, the auxiliary storage device, or a register or cache memory in the processor 11.

The entry field extraction program is a program that causes the computer to execute a process conducted by the input unit 21, a process conducted by the learning unit 22, a process conducted by the feature field extraction unit 23, a process conducted by the object field extraction unit 24, a process conducted by the entry field extraction unit 25, a process conducted by the entry field synthesis unit 26, and a process conducted by the output unit 27, as an input process, a learning process, a feature field extraction process, an object field extraction process, an entry field extraction process, an entry field synthesis process, and an output process, respectively. The entry field extraction program may be recorded in a computer readable medium and provided in the form of the medium, may be stored in a recording medium and provided in the form of the recording medium, or may be provided as a program product.

The entry field extraction device 10 may be constituted of one computer or of a plurality of computers. If the entry field extraction device 10 is constituted of a plurality of computers, the functions of the input unit 21, learning unit 22, feature field extraction unit 23, object field extraction unit 24, entry field extraction unit 25, entry field synthesis unit 26, and output unit 27 may be implemented through distribution among the computers.

Description of Behavior

Figure 2:
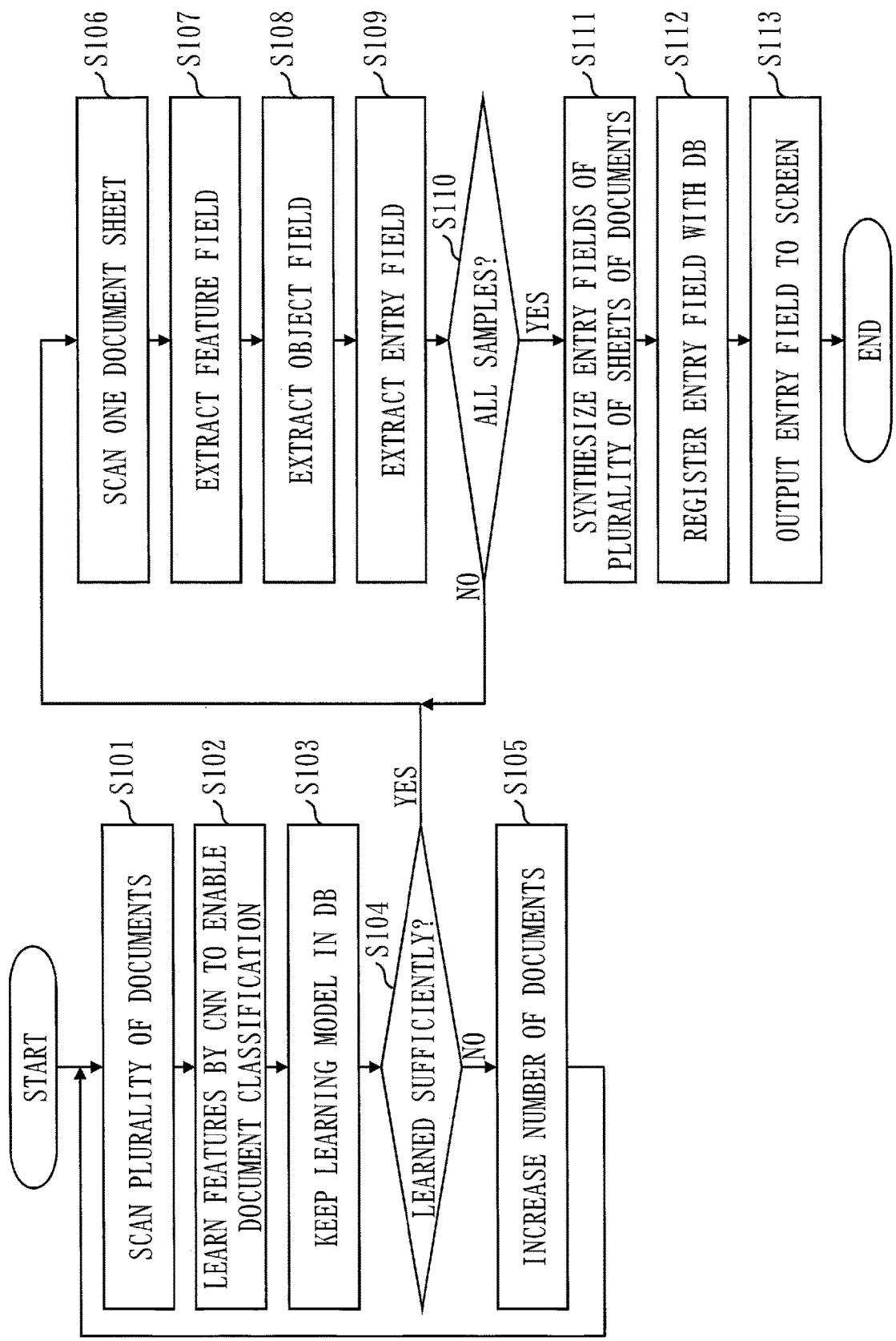
FIG. 2 is a flowchart illustrating behavior of the entry field extraction device according to Embodiment 1.

Behavior of the entry field extraction device 10 according to the present embodiment will be described with referring to FIG. 2. The behavior of the entry field extraction device 10 corresponds to an entry field extraction method according to the present embodiment.

In step S101, the images 30 of the plurality of documents are inputted to the input unit 21. Specifically, the input unit 21 accepts an operation of scanning the plurality of documents, from a user.

In step S102, the learning unit 22 obtains the learning model 31 by learning features corresponding to the document types from the images 30 of the plurality of documents inputted to the input unit 21. Specifically, the learning unit 22 learns the features of the images 30 using CNN so that the documents can be classified. That is, the learning unit 22 learns a classification problem from the plurality of sheets of images 30 being a result of scanning in step S101, using a neural network. Note that "CNN" stands for Convolutional Neutral Network.

In step S103, the learning unit 22 writes the obtained learning model 31 to the memory 12. Specifically, the learning unit 22 stores the learning model 31 being a result of learning in step S102, in the database constructed in the memory 12.

In step S104, the input unit 21 inquires of the user whether learning is sufficient. If the user determines that learning is not sufficient, a number of documents is increased in step S105, and a process of step S101 is performed again. If the user determines that learning is sufficient, then in step S106, an image 40 of one document sample is inputted to the input unit 21. Specifically, the input unit 21 accepts an operation of scanning one document, from the user.

Figure 3:
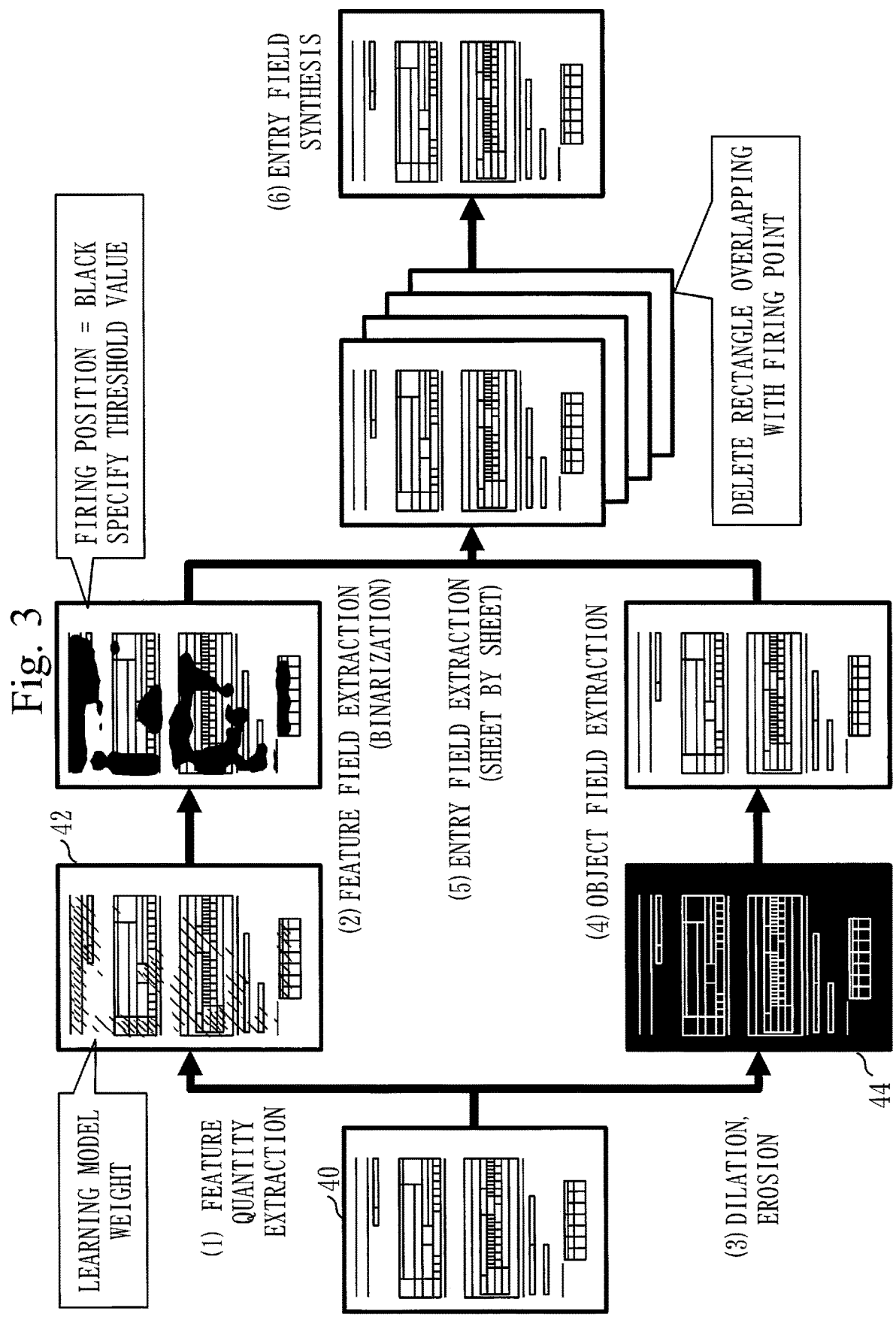
FIG. 3 is a diagram illustrating a flow of processing conducted by the entry field extraction device according to Embodiment 1.
Figure 4:
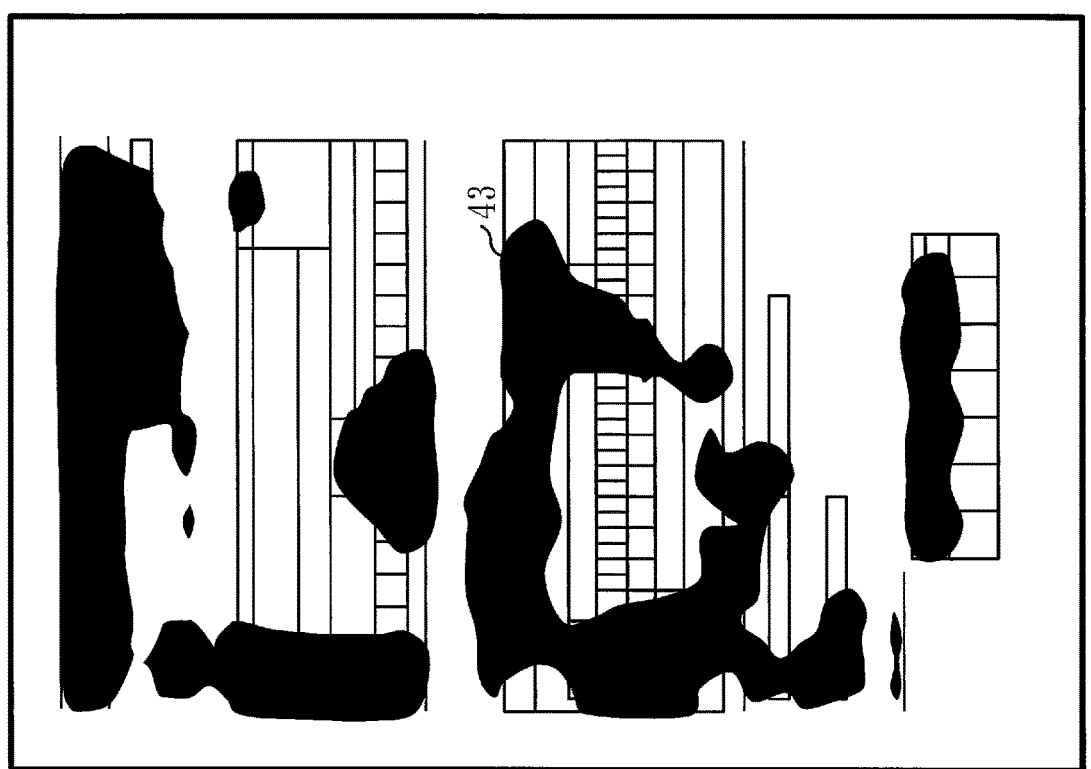
FIG. 4 is a diagram illustrating an example of a binarization process conducted by the entry field extraction device according to Embodiment 1.
Figure 4:
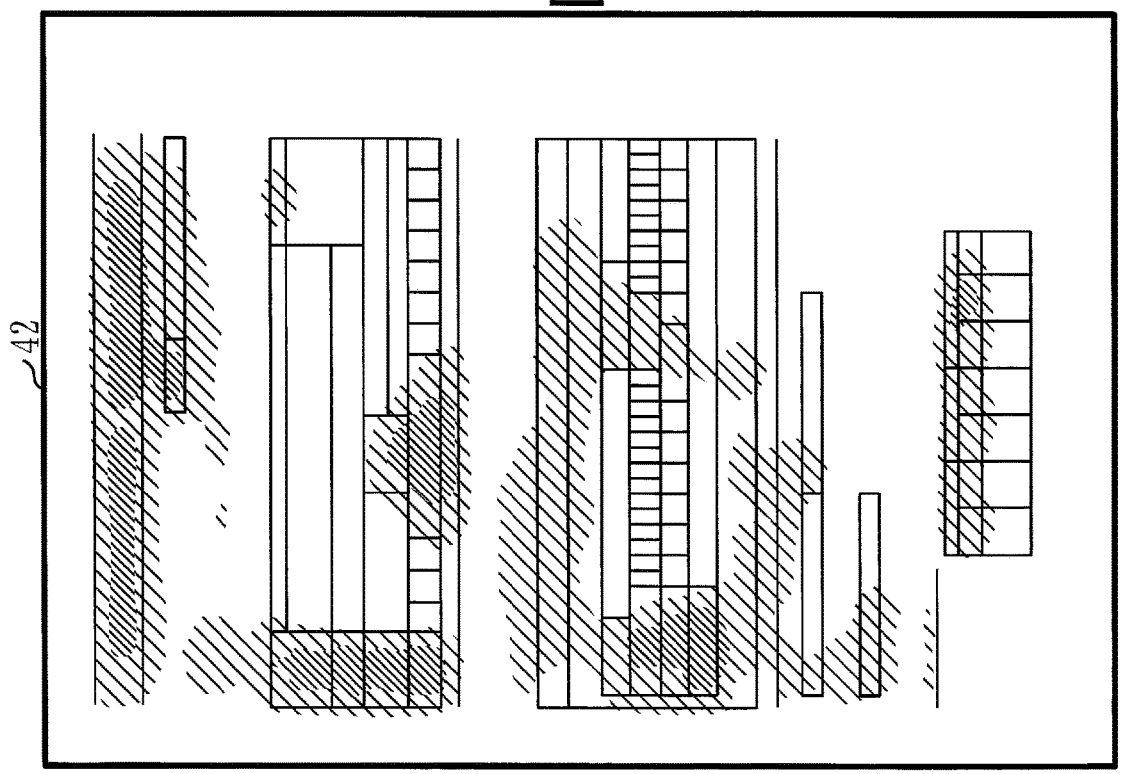
Figure 5:
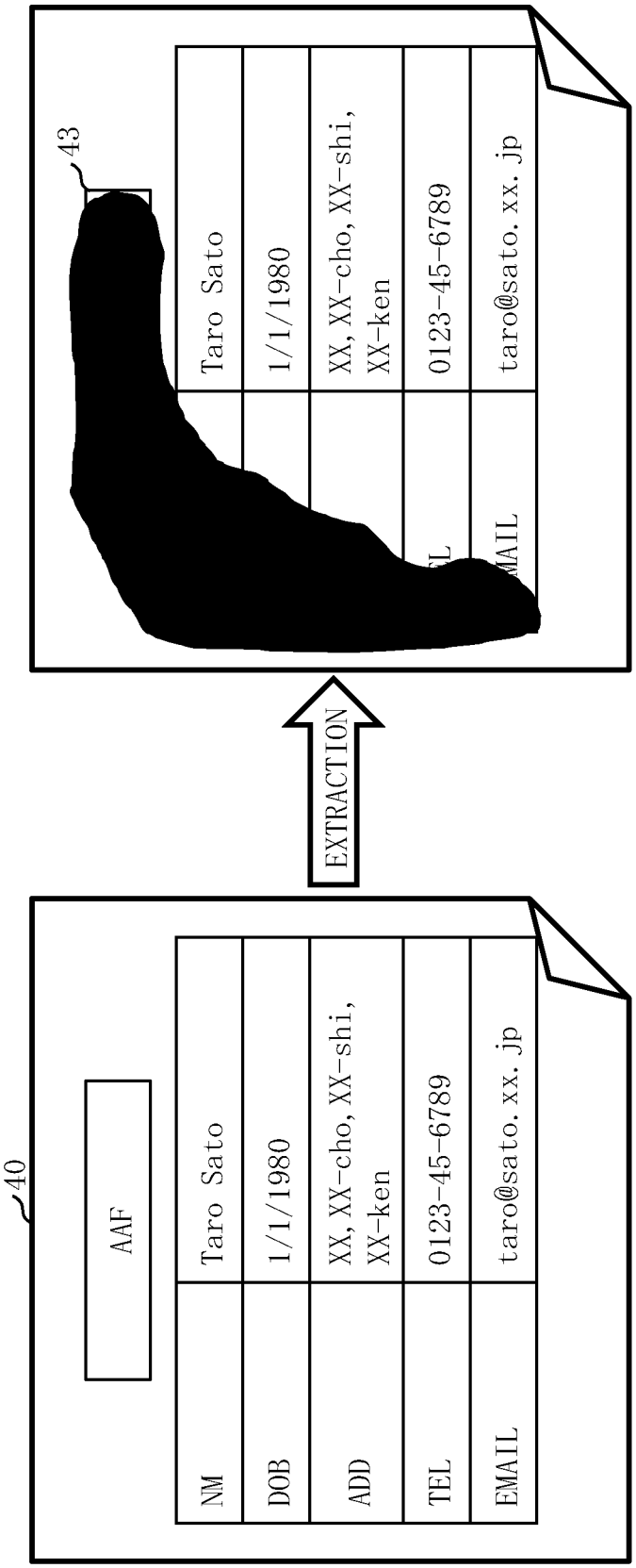
FIG. 5 is a diagram illustrating an example of a feature field extraction process conducted by the entry field extraction device according to Embodiment 1.

In step S107, the feature field extraction unit 23 extracts, from the image 40 of the document sample inputted to the input unit 21, a feature field 43 being a field indicating a feature corresponding to the type of the document sample, using the learning model 31, as illustrated in FIGS. 3 to 5. Specifically, the feature field extraction unit 23 generates a map 42 by expressing, in a numerical value, saliency of the feature corresponding to the type of the document sample in units of pixels of the image 40 of the document sample. Then, the feature field extraction unit 23 binarizes the generated map 42 to divide the map 42 into the feature field 43 and the remaining field. That is, the feature field extraction unit 23 binarizes the numerical value of the calculated saliency referring to a threshold value, to divide the image 40 of the document sample into the feature field 43 and the remaining field.

More specifically, the feature field extraction unit 23 calculates firing positions corresponding to the type of a classification-target document, in one sheet of the image 40 being a result of scanning in step S106, by a scheme such as CAM and Grad-CAM, thereby generating a heat map as the map 42, as illustrated in FIGS. 3 and 4. Then, the feature field extraction unit 23 binarizes the heat map by dividing the firing positions referring to the threshold value. Namely, the feature field extraction unit 23 converts the heat map into a black-and-white image. Note that "CAM" stands for Class Activation Mapping, and "Grad-CAM" stands for Gradient-weighted Class Activation Mapping. The threshold value for binarization may be a fixed value, or a value adjustable by the user via GUI. Note that "GUI" stands for Graphical User Interface.

In the example of FIG. 5, of the image 40 of the document sample, a field listing a character string "account application form" (AAF for short) expressing the type of the document, and character strings "name" (NM for short), "date of birth" (DOB for short), "address" (ADD for short), "telephone number" (TEL for short), and "email" (EMAIL), which are indexes of entry columns commonly appearing in account application forms, is extracted as one feature field 43. It is determined that entry columns themselves, namely, fields where name, date of birth, address, telephone number, email address that differ from one account application form to another are entered do not belong to the feature field 43.

Figure 6:
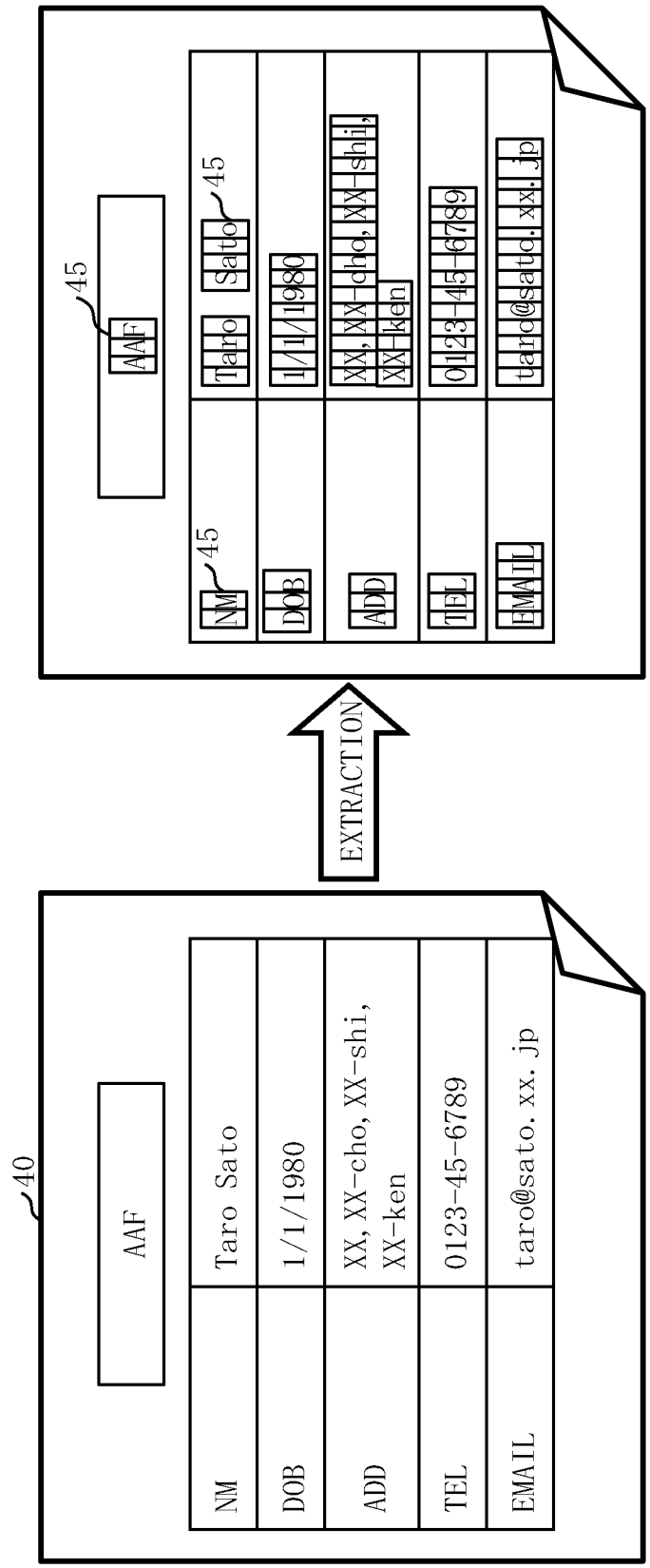
FIG. 6 is a diagram illustrating an example of an object field extraction process conducted by the entry field extraction device according to Embodiment 1.

In step S108, the object field extraction unit 24 extracts, from the image 40 of the document sample inputted to the input unit 21, one or more object fields 45 each being a field where an object is written in the document sample, as illustrated in FIGS. 3 and 6. In the present embodiment, the object field extraction unit 24 recognizes at least a character and a mark, each as an object. The object field extraction unit 24 may recognize a figure such as a rectangular frame, as an object.

Specifically, as illustrated in FIG. 3, the object field extraction unit 24 converts one image 40 being the result of scanning in step S106 into an inverted image 44 by black/white inversion, dilates and erodes white portions in the inverted image 44, and recognizes each object corresponding to one character or one mark, as a lump. This can prevent splitting of the character or mark. After that, the object field extraction unit 24 extracts contours of the objects, and extracts a rectangle surrounding the extracted contours, as the object field 45. The object field 45 serves as a candidate of a field to be separated in the next step. The object field extraction unit 24 may dilate and erode the black portions in the image 40 without black/white inversion of the image 40, and may recognize each object corresponding to one character or one mark, as a lump.

In the example of FIG. 6, characters in the character string "AAF" (account application form) expressing the type of the document, and characters in the character strings "NM" (name), "DOB" (date of birth), "ADD" (address), "TEL" (telephone number), and "EMAIL" (email), which are indexes of entry columns commonly appearing in account application forms, are objects. Characters in character strings of the name, date of birth, address, telephone number, and email address themselves which are entered in the entry columns are also objects. Of the image 40 of the document sample, fields where these objects are written are extracted as the object fields 45.

The process of step S108 may be employed together with OCR, or may be replaced by OCR. Note that "OCR" stands for Optical Character Recognition.

Figure 7:
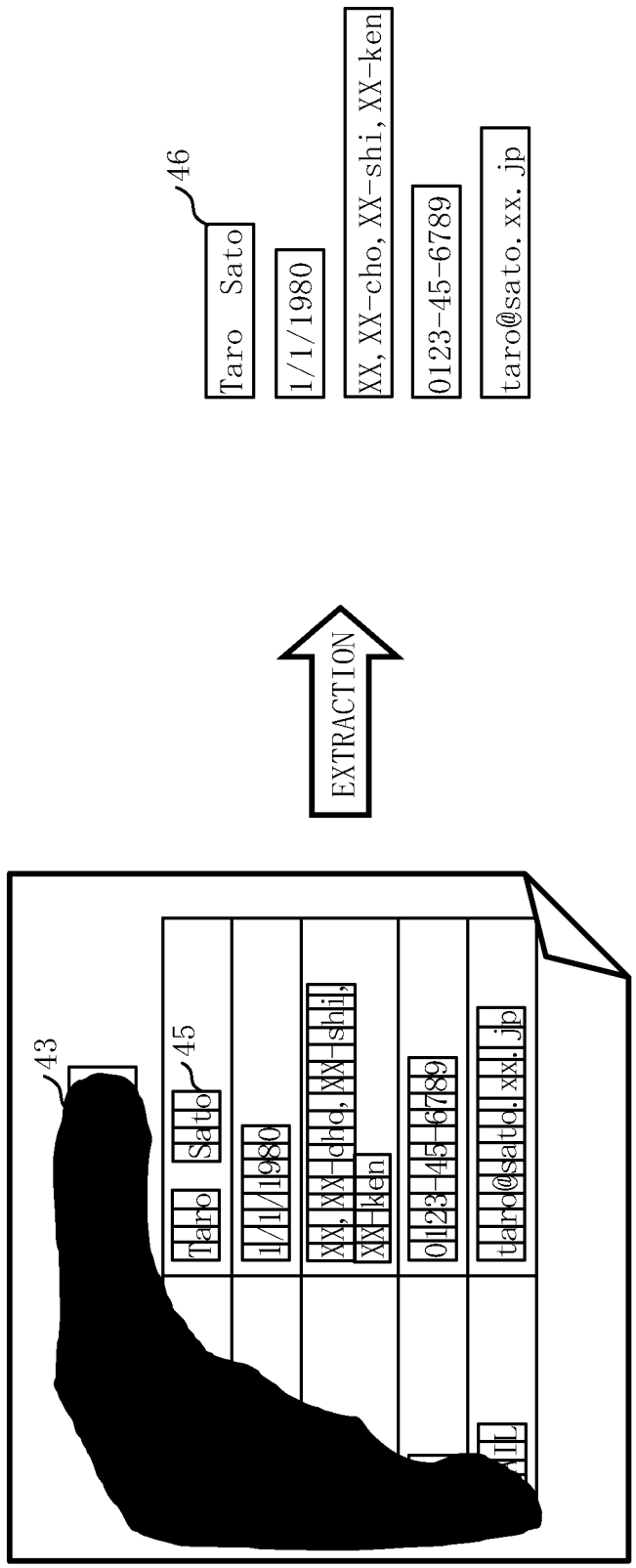
FIG. 7 is a diagram illustrating an example of an entry field extraction process conducted by the entry field extraction device according to Embodiment 1.

In step S109, as illustrated in FIGS. 3 and 7, the entry field extraction unit 25 extracts an entry field 46, being a field of an entry column, from a field that remains in the image 40 of the document sample from which the feature field 43 extracted by the feature field extraction unit 23 has been excluded. Specifically, the entry field extraction unit 25 excludes, among the object fields 45 extracted by the object field extraction unit 24 as candidates of the entry field 46, an object field 45 that overlaps with the feature field 43, from the candidates of the entry field 46, and extracts the remaining candidate as the entry field 46. More specifically, the entry field extraction unit 25 excludes a rectangle overlapping with the firing positions calculated in step S107, from candidates of the field extracted in step S108, and separates the remaining rectangle as the entry field 46.

Figure 8:
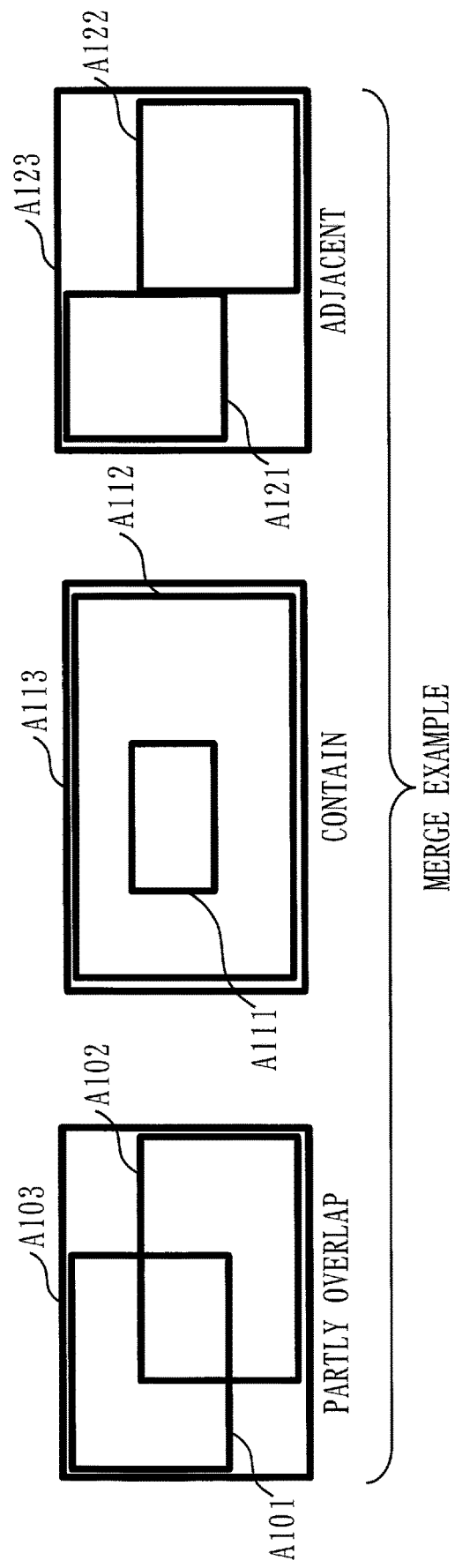
FIG. 8 is a diagram illustrating an example of an entry field merge process conducted by the entry field extraction device according to Embodiment 1.

In the present embodiment, the entry field extraction unit 25 synthesizes, among the object fields 45 extracted by the object field extraction unit 24, two or more object fields 45 overlapping with each other. Specifically, in a case where a certain rectangle A101 and another rectangle A102 partially overlap with each other, the entry field extraction unit 25 merges the rectangles A101 and A102 to form one rectangle A103, as illustrated in FIG. 8. In a case where a certain rectangle A111 is contained in another rectangle A112, the entry field extraction unit 25 merges the rectangles A111 and A112 to form one rectangle A113, as illustrated in FIG. 8.

In the present embodiment, the entry field extraction unit 25 synthesizes, among the object fields 45 extracted by the object field extraction unit 24, 2 or more object fields 45 a distance between which is equal to or smaller than a threshold value. Specifically, in a case where a certain rectangle A121 and another rectangle A122 are adjacent to each other, the entry field extraction unit 25 merges the rectangles A121 and A122 to form one rectangle A123, as illustrated in FIG. 8. The threshold value of the distance may be set to 0, or to a value larger than 0.

In the present embodiment, the entry field extraction unit 25 excludes, among the object fields 45 extracted by the object field extraction unit 24, an object field 45 having an area equal to or smaller than a threshold value, from the candidates of the entry fields 46. Specifically, the entry field extraction unit 25 deletes rectangles each having a predetermined area or less.

The threshold value of the distance as a condition of merging by the entry field extraction unit 25, or the threshold value of the area as a condition of deletion by the entry field extraction unit 25, may be adjustable by the user via GUI. The threshold value of the area may be added to the condition of merging.

In the example of FIG. 7, the object fields 45 of the characters of the character strings "AAF" (account application form), "NM" (name), "DOB" (date of birth), "ADD" (address), "TEL" (telephone number), and "EMAIL" (email) overlap with the feature field 43 and accordingly are excluded from the candidates of the entry fields 46. The object fields 45 of characters of the character strings of the name, date of birth, address, telephone number, and email address themselves which are entered in the entry columns are synthesized in units of character strings, and are extracted as the entry fields 46. In fine, the entry ranges of five character strings are each extracted as the entry field 46. As for the character string of the name, in the first stage, the object fields 45 of the characters of the family name are merged to obtain one rectangle corresponding to the family name, and the object fields 45 of the characters of the first name are merged to obtain one rectangle corresponding to the first name. In the second stage, since the rectangle corresponding to the family name and the rectangle corresponding to the first name are at a close distance to each other, these two rectangles are merged to obtain an entry field 46 being one rectangle. In this example, one entry field 46 is extracted for the family name and the first name being put together. Alternatively, the threshold value of the distance described above may be set small so that separate entry fields 46 are obtained for the family name and the first name.

In step S110, the input unit 21 inquires of the user whether processing is completed for the images 40 of all document samples. If the user determines that processing is not completed, the process of step S106 is performed again. If the user determines that processing is completed, the process of step S111 is performed.

In step S111, in a case where two or more entry fields 46, being extracted by the entry field extraction unit 25 from a field that remains in an image 40 of each of different document samples from which feature fields 43 have been excluded, overlap with each other as illustrated in FIG. 3, the entry field synthesis unit 26 synthesizes the two or more entry fields 46. Specifically, in a case where one rectangle of a certain document sample and one rectangle of another document sample overlap with each other, the entry field synthesis unit 26 merges the two rectangles to form one rectangle. Then, assuming that, for example, of two account application forms, address has been entered leftward in the address column in one account application form, and address has been entered rightward in the address column in the other account application form, the whole address column can be recognized as one entry field 46.

Figure 9:
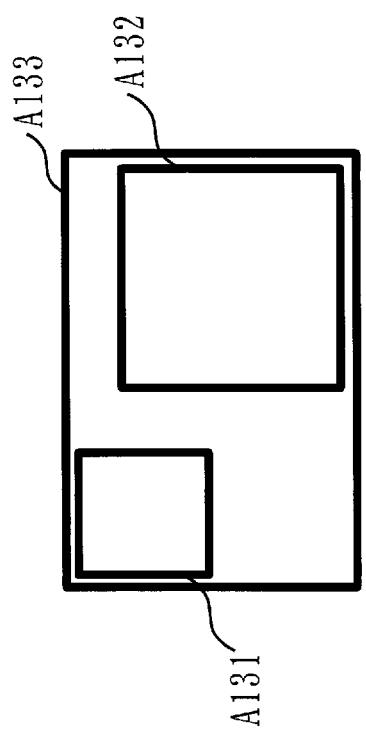
FIG. 9 is a diagram illustrating an example of an entry field synthesis process conducted by the entry field extraction device according to Embodiment 1.

In this manner, in the present embodiment, the entry field synthesis unit 26 merges rectangles that overlap with each other among a plurality of document sheets. As a condition for this merging, an area of an overlapping portion of the rectangles may be set. That is, whether or not to merge rectangles that overlap with each other among a plurality of document sheets may be determined depending on the area of the overlapping portion. Furthermore, the entry field synthesis unit 26 may merge rectangles whose positions are near among the plurality of document sheets. As a condition for this merging, distances among the rectangles may be set. That is, whether or not to merge rectangles whose positions are near among a plurality of document sheets may be determined depending on the distances. A threshold value of the distances and a threshold value of the area, which are the conditions of merging, may be adjustable by the user via GUI. In this case, the user can narrow down a number of the rectangles to a predetermined number while relaxing the conditions on the distances and area. Alternatively, the user may be able to specify to what number the number of rectangles may be narrowed down, instead of the threshold value of the distances and the threshold value of the area. In this case, the entry field synthesis unit 26 narrows down the number of rectangles to a specified number automatically while relaxing the conditions of the distances and area. Specifically, the entry field synthesis unit 26 can choose whether or not to merge a rectangle A131 of a certain document sample and a rectangle A132 of another document sample to form one rectangle A133, as illustrated in FIG. 9, by adjusting the threshold value of the distance.

In step S112, the entry field synthesis unit 26 registers, with the entry field database 41, an entry field 46 obtained by appropriately synthesizing in step S111 the entry fields 46 extracted in step S110. The entry field 46 may be recorded in any format. In the present embodiment, the entry field 46 is recorded by coordinates of one vertex of the rectangle and a longitudinal length and lateral length of the rectangle.

In step S113, the output unit 27 outputs data registered with the entry field database 41 to the screen of the display 50.

As described above, in the present embodiment, the feature field extraction unit 23 extracts the feature field 43 of the image 40 based on the result of classification performed by the neural network. The object field extraction unit 24 specifies the object field 45 such as a character string and a seal mark in the image 40. The entry field extraction unit 25 extracts the entry field 46 from the feature field 43 and the object fields 45.

The object field extraction unit 24 forms the objects of one document sheet, each into a lump by dilation processing, and surrounds the contours of the objects with a rectangle, to extract the object field 45 of one document sheet.

The feature field extraction unit 23 extracts the feature field 43 of the document based on the classification result of the neural network and an output result of a hidden layer of the neural network.

The entry field synthesis unit 26 places an entry field 46 of one document sheet which is outputted from the entry field extraction unit 25 over the entry field 46 of another document which are outputted from the entry field extraction unit 25, one over another in the plurality of document sheets, thereby synthesizing an overlapping rectangle.

Description of Effect of Embodiment

In the present embodiment, the image 40 of the document sample is not finely divided, and a field of an entry column is extracted from a field that remains in the image 40 from which the feature field 43 extracted with using the learning model 31 has been excluded. Hence, an influence of deviation and noise can be reduced. Therefore, according to the present embodiment, a field of an entry column can be extracted from the document sample with high precision.

Conventionally, when acquiring information from a document filled by someone, an acquiring position must be specified manually, and a template of the document must be defined. In the present embodiment, fields of a character, a seal, and the like inputted manually can be specified automatically. Hence, in the present embodiment, based on a result of document identification conducted by the neural network, the feature field 43 being a pixel group serving as a major factor in the identification is specified from the identification result and the neuron of the intermediate layer, and the object fields 45 from which the feature field 43 has been excluded are treated as the entry fields 46. That is, in the present embodiment, the feature field 43 is obtained from the classification result of the neural network. Then, portions other than the feature field 43 are treated as fields other than the document format, thereby extracting the entry fields 46.

According to the present embodiment, the entry fields 46 can be extracted from the plurality of document sample sheets automatically without defining the templates or the features of the documents.

According to the present embodiment, the entry fields 46 can be extracted with using the classification result of the documents, so that calculation resources can be economized. That is, there is no need to construct a new CNN or to make a rule for extracting the entry fields 46, for the purpose of extracting the entry fields 46.

Other Configurations

In the present embodiment, the functions of the input unit 21, learning unit 22, feature field extraction unit 23, object field extraction unit 24, entry field extraction unit 25, entry field synthesis unit 26, and output unit 27 are implemented by software. In a modification, the functions of the input unit 21, learning unit 22, feature field extraction unit 23, object field extraction unit 24, entry field extraction unit 25, entry field synthesis unit 26, and output unit 27 may be implemented by a combination of software and hardware. That is, some of the functions of the input unit 21, learning unit 22, feature field extraction unit 23, object field extraction unit 24, entry field extraction unit 25, entry field synthesis unit 26, and output unit 27 may be implemented by dedicated hardware, and the remaining functions may be implemented by software.

The dedicated hardware is, for example, a single circuit, a composite circuit, a programmed processor, a parallel-programmed processor, a logic IC, a GA, an FPGA, or an ASIC; or a combination of some or all of a single circuit, a composite circuit, a programmed processor, a parallel-programmed processor, a logic IC, a GA, an FPGA, and an ASIC. Note that "IC" stands for Integrated Circuit, "GA" for Gate Array, "FPGA" for Field-Programmable Gate Array, and "ASIC" for Application Specific Integrated Circuit.

The processor 11 and the dedicated hardware are both processing circuitry. That is, regardless of whether the functions of the input unit 21, learning unit 22, feature field extraction unit 23, object field extraction unit 24, entry field extraction unit 25, entry field synthesis unit 26, and output unit 27 may be implemented by software or a combination of software and hardware, behavior of the input unit 21, learning unit 22, feature field extraction unit 23, object field extraction unit 24, entry field extraction unit 25, entry field synthesis unit 26, and output unit 27 is performed by processing circuitry.

REFERENCE SIGNS LIST

10: entry field extraction device; 11: processor; 12: memory; 21: input unit; 22: learning unit; 23: feature field extraction unit; 24: object field extraction unit; 25: entry field extraction unit; 26: entry field synthesis unit; 27: output unit; 30: image; 31: learning model; 40: image; 41: entry field database; 42: map; 43: feature field; 44: inverted image; 45: object field; 46: entry field; 50: display.

The invention claimed is:

1. An entry field extraction device comprising:
    processing circuitry
        to extract, from an image of at least one document sample, a feature field being a field indicating a feature corresponding to a type of the document sample, using a learning model obtained by learning, from images of a plurality of documents, features corresponding to types of the documents, the plurality of documents including entry columns predetermined according to the types of the documents, the entry columns having been filled separately in the individual documents, and
        to extract an entry field, being a field of an entry column, from a field that remains in the image of the document sample from which the extracted feature field has been excluded,
    wherein the processing circuitry expresses, in a numerical value, saliency of the feature corresponding to the type of the document sample in units of pixels of the image of the document sample, and binarizes the numerical value of the saliency referring to a threshold value, to divide the image of the document sample into the feature field and the remaining field, and
    wherein the processing circuitry, in a case where feature fields are extracted from the images of the plurality of document samples, and two or more entry fields, being extracted from fields that remain in images of each of different document samples from which the feature fields have been excluded, overlap with each other, synthesizes the two or more entry fields.

2. An entry field extraction device comprising:
    processing circuitry
        to extract, from an image of at least one document sample, a feature field being a field indicating a feature corresponding to a type of the document sample, using a learning model obtained by learning, from images of a plurality of documents, features corresponding to types of the documents, the plurality of documents including entry columns predetermined according to the types of the documents, the entry columns having been filled separately in the individual documents,
        to extract an entry field, being a field of an entry column, from a field that remains in the image of the document sample from which the extracted feature field has been excluded, and
        to extract, from the image of the document sample, one or more object fields each being a field where an object is written in the document sample, as candidates of the entry field,
    wherein the processing circuitry excludes, among the extracted object fields, an object field that overlaps with the feature field, from the candidates of the entry field, and
    wherein the processing circuitry, in a case where feature fields are extracted from the images of the plurality of document samples, and two or more entry fields, being extracted from fields that remain in images of each of different document samples from which the feature fields have been excluded, overlap with each other, synthesizes the two or more entry fields.

3. The entry field extraction device according to claim 2, wherein the processing circuitry synthesizes, among the extracted object fields, two or more object fields overlapping with each other.

4. The entry field extraction device according to claim 2, wherein the processing circuitry synthesizes, among the extracted object fields, two or more object fields a distance between which is equal to or smaller than a threshold value.

5. The entry field extraction device according to claim 2, wherein the processing circuitry excludes, among the extracted object fields, an object field having an area equal to or smaller than a threshold value, from the candidates of the entry field.

6. The entry field extraction device according to claim 2, wherein the processing circuitry recognizes at least a character and a mark, each as the object.

7. A non-transitory computer readable medium storing an entry field extraction program which causes a computer to execute:
    a feature field extraction process of extracting, from an image of at least one document sample, a feature field being a field indicating a feature corresponding to a type of the document sample, using a learning model obtained by learning, from images of a plurality of documents, features corresponding to types of the documents, the plurality of documents including entry columns predetermined according to the types of the documents, the entry columns having been filled separately in the individual documents; and
    an entry field extraction process of extracting an entry field, being a field of an entry column, from a field that remains in the image of the document sample from which the feature field extracted by the feature field extraction process has been excluded,
    wherein the feature field extraction process comprises expressing, in a numerical value, saliency of the feature corresponding to the type of the document sample in units of pixels of the image of the document sample, and binarizing the numerical value of the saliency referring to a threshold value, to divide the image of the document sample into the feature field and the remaining field, and
    wherein, in a case where feature fields are extracted from the images of the plurality of document samples, and two or more entry fields, being extracted from fields that remain in images of each of different document samples from which the feature fields have been excluded, overlap with each other, synthesizes the two or more entry fields.

8. A non-transitory computer readable medium storing an entry field extraction program which causes a computer to execute:
    a feature field extraction process of extracting, from an image of at least one document sample, a feature field being a field indicating a feature corresponding to a type of the document sample, using a learning model obtained by learning, from images of a plurality of documents, features corresponding to types of the documents, the plurality of documents including entry columns predetermined according to the types of the documents, the entry columns having been filled separately in the individual documents;

an entry field extraction process of extracting an entry field, being a field of an entry column, from a field that remains in the image of the document sample from which the feature field extracted by the feature field extraction process has been excluded; and an object field extraction process of extracting, from the image of the document sample, one or more object fields each being a field where an object is written in the document sample, as candidates of the entry field, wherein the entry field extraction process comprises excluding, among the object fields extracted by the object field extraction process, an object field that overlaps with the feature field, from the candidates of the entry field, and wherein, in a case where feature fields are extracted from the images of the plurality of document samples, and two or more entry fields, being extracted from fields that remain in images of each of different document samples from which the feature fields have been excluded, overlap with each other, synthesizes the two or more entry fields.

* * * * *